P. W. FLEISCHER.
ARTICLE FEEDING MECHANISM.
APPLICATION FILED DEC. 7, 1912.
1,116,406.
Patented Nov. 10, 1914.
2 SHEETS—SHEET 1.
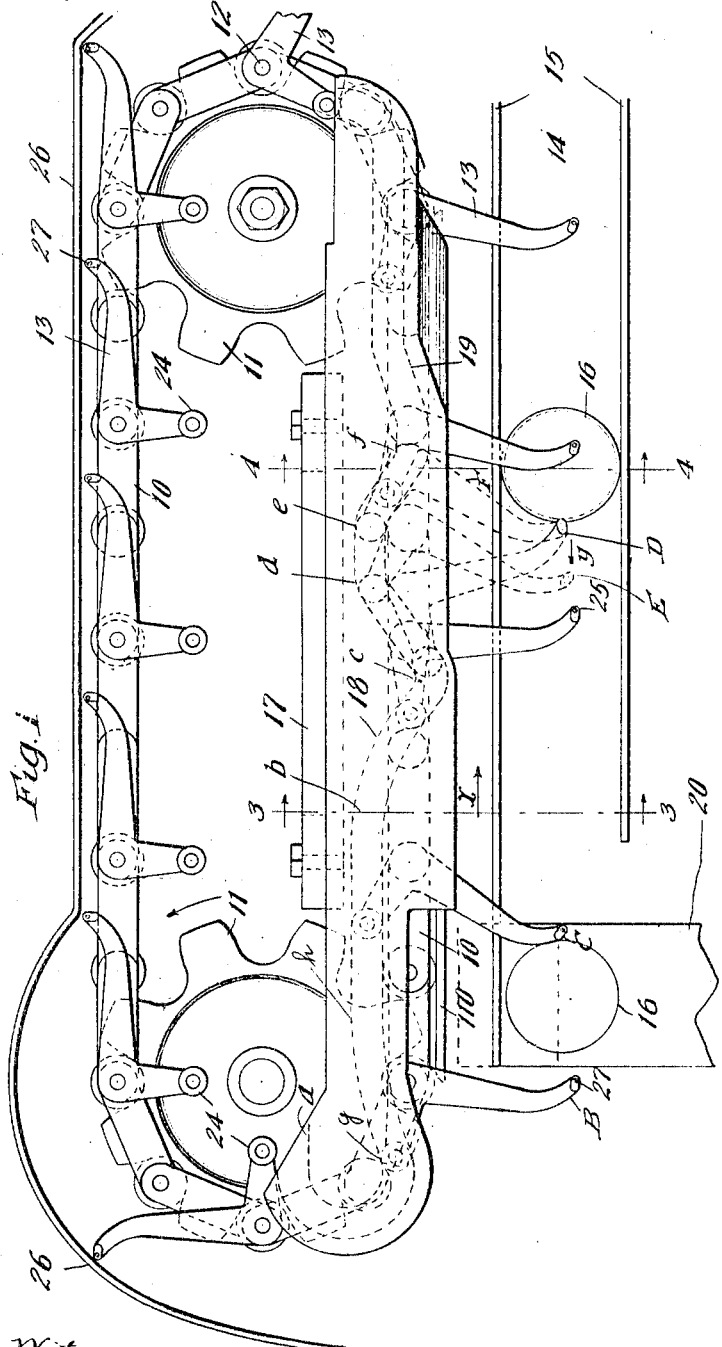
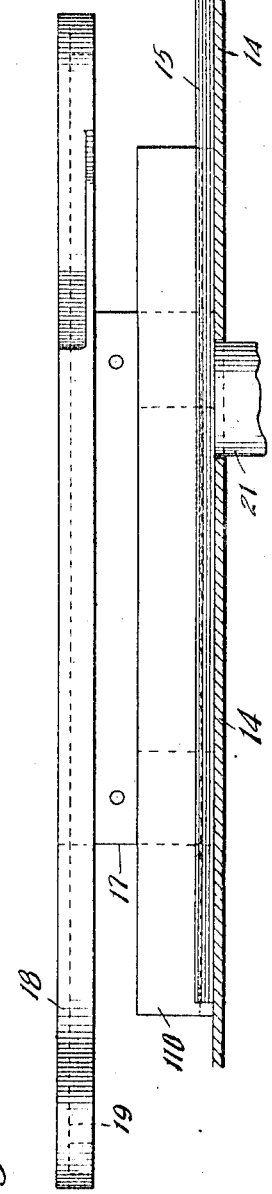
Witnesses:
Wm. Geiger
Pearl Abrams
Inventor:
Paul W. Fleischer
By Munday, Evarts, Adcock & Clarke,
his Attys.

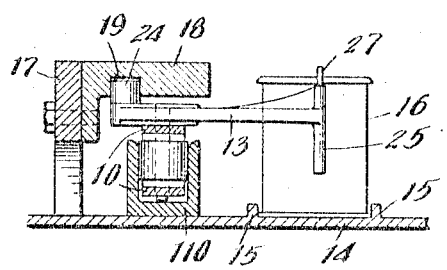
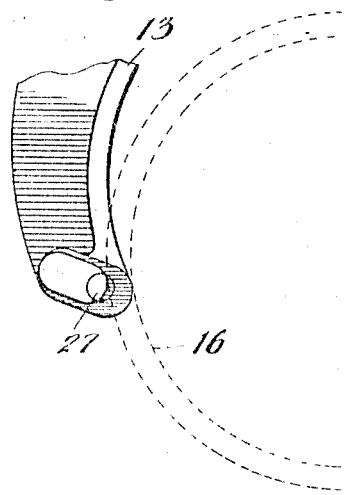
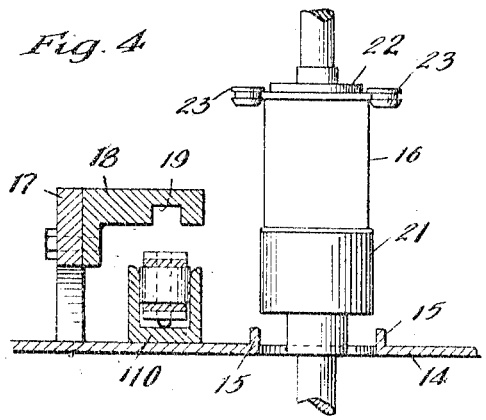

UNITED STATES PATENT OFFICE.

PAUL W. FLEISCHER, OF WEST HOBOKEN, NEW JERSEY, ASSIGNOR TO AMERICAN CAN COMPANY, OF NEW YORK, N. Y., A CORPORATION OF NEW JERSEY.

ARTICLE-FEEDING MECHANISM.

1,116,406. Specification of Letters Patent. Patented Nov. 10, 1914.

Application filed December 7, 1912. Serial No. 735,415.

*To all whom it may concern:*

Be it known that I, PAUL W. FLEISCHER, a citizen of the United States, residing in West Hoboken, in the county of Hudson and State of New Jersey, have invented a new and useful Improvement in Article-Feeding Mechanism, of which the following is a specification.

This invention relates to improvements in article feeding mechanism.

One object of the invention is to provide a mechanism adapted to feed, propel or convey articles, such as food container cans, all the movable parts of which have a constant, continuous movement, but which at the same time cause the articles being propelled to have an interrupted or intermittent movement.

Another object of the invention is to provide a conveyer which partakes of the nature of an intermittently operated conveyer, and yet which has continuous movement, and avoids all the objections hitherto inherent in intermittently operated conveyers having parts which are repeatedly started and stopped.

Another object of the invention is to provide a feeding mechanism of the type above indicated which, while having continuous movement, will permit the articles being propelled to have an interval of rest, and which will bring the articles to a stop and start them again gradually and without jars or shocks and thereby prevent spilling of the contents in the case of filled cans being conveyed to a double seamer.

A still further object of the invention is to provide a feeding mechanism or conveyer which is adapted to propel articles at a higher rate than has hitherto been found practical in intermittently operated conveyers.

The invention furthermore consists in the improvements in the parts and devices and in the novel combinations of parts and devices herein shown, described or claimed.

Hitherto, in many machines, such as double seaming machines, flanging machines, filling machines and various other types of machines where articles are fed or propelled through the machine and it has been necessary to allow the articles to come to a rest for a short period in order to be operated upon, it has been the universal practice, so far as I am aware, to employ an intermittently operated conveyer, commonly including a Geneva stop motion, or, in other words, a conveyer which is continually started and stopped. Such intermittently operated conveyers have many inherent disadvantages, among which may be mentioned the fact that the repeated starting and stopping of heavy parts of the mechanism soon wears out the machine, thus necessitating replacing and constant adjustments of parts, and the sudden starting and stopping, in the case where filled cans are being propelled to a seaming mechanism, causes spilling of the contents, and in those cases where a cover is loosely applied to the can while being propelled to the seaming mechanism, the sudden stop is likely to displace the cover, thus preventing the formation of a perfect, hermetic seam.

With my improvements all the disadvantages of an intermittently operated conveyer are done away with, and to accomplish this result, my improved mechanism, generally stated, comprises a constantly continuously movable member, having mounted thereon and bodily movable therewith a plurality of propelling arms or flights which are operated independently of their bodily movement in such a way that the engaging or propelling portions thereof are alternately accelerated and retarded in the direction of movement of the carrying member, so that the cans or other articles being propelled are advanced to a predetermined position by the propelling arms or flights, whereupon the latter are retracted from engagement with the can or other article for a sufficient period to allow the seaming, flanging or other operation to take place, when the arm or flight is again brought into engagement with the can or article and the movement of the same completed.

In the drawing forming a part of this specification, Figure 1 is a plan view of a mechanism embodying one form of my improvements, showing in dotted lines several positions assumed by the propelling arms or flights during the constant continuous movement of the endless carrying chain. Fig. 2 is a vertical section of the mechanism shown in Fig. 1, the endless chain conveyer being omitted. Fig. 3 is a vertical, transverse sectional view, taken substantially on the line 3—3 of Fig. 1. Fig. 4 is a similar view, taken substantially on the line 4—4 of Fig.

1, and showing parts of a double seaming mechanism, and Fig. 5 is a detail plan view of a portion of the propelling arm or flight, and showing in dotted lines the relative positions of a can body and cover thereon.

In said drawing, the conveyer or feeding mechanism, as shown, comprises a constantly, continuously movable endless link chain 10, carried and adapted to be propelled by a pair of sprocket gears 11, 11, driven from any suitable source, (not shown). Pivotally mounted on the chain 10, and preferably on alternate pivot pins 12 connecting the links of the chain, are a plurality of bell crank shaped propelling arms or flights 13, the latter having a portion of their path of travel over a table 14, proved with a guide 110 for the chain 10 and a suitable track formed by guides 15, 15, along which articles, such as can bodies 16 are adapted to be propelled. Secured to the table 14 is a bracket member 17, to which is secured a cam track 18, having a cam groove 19 on its under face, the latter being more particularly hereinafter described. The can bodies or other articles are adapted to be fed to the table 14 by any suitable means, such as a belt conveyer 20, the articles being stopped by the rear guide 15, and then engaged and propelled by the propelling arms or flights 13 to a position above a plunger 21 in alinement with a double seaming mechanism having a chuck 22 and seaming rollers 23 (see Fig. 4), where the cans or other articles are brought to rest for a short period, and the double seaming or other operation performed, after which the cans or other articles are moved along the guideway and ejected from the machine onto a belt or other means (not shown).

Each propelling arm or flight 13 has mounted thereon a roller 24 which is adapted to engage in the groove cam 19 and be governed thereby. The rollers 24 first enter the cam 19 at a point a and assume the various positions, as shown at B and C, as the endless chain moves in the direction indicated by the arrow x. At the position C, the propelling arm will have engaged a can and will continue to move the same at the same rate as that of movement of the chain 10, until the roller reaches the point b in the cam 19. While the roller is traversing the groove cam between the points b and c, the engaging end or vertical finger 25 will be accelerated to a speed greater than that of the endless chain 10, until the propelling arm reaches the position shown in dotted line at D, at which time the can will have been brought to its proper position in alinement with the double seaming mechanism. As the roller 24 of the propelling arm traverses the groove cam 19 from the point c to the point d, the engaging end or finger 25 of the arm will be retracted from the position shown at D to the position shown in dotted line at E, as indicated by the arrow y. While the roller 24 is traversing the straight section of the groove cam between the points d and e, the speed of travel of the engaging end of the propelling arm will be the same as that of the chain 10, and the propelling arm will then occupy the position shown in dotted line at F, at which time the seaming or other operation will have been completed and the can will be engaged by the propelling arm and advanced along the guide-way. While the roller 24 is traversing the inclined portion of the groove cam between the points e and f, the engaging end of the arm will be accelerated relatively to the speed of the chain, and as the movement of the chain and the propelling arm carried thereby is continued, the can body will be moved along the guide and ejected therefrom. In order to insure the rollers 24 entering the groove cam 19 at the point a, any suitable means may be provided, that shown in the drawing comprising a guard 26.

The mechanism shown in the drawing is adapted to propel can bodies which already have their covers placed thereon when delivered to the table 14, and in order to maintain the covers and bodies in proper position relatively to each other as the same are being propelled by the arms 13, the latter are provided with a small pin 27 slightly offset from the finger 25, the offset corresponding to the difference in diameters between the cover and body.

It will be apparent that by varying the outlines of the groove cam 19, the oscillating movements of the propelling arms or flights may be varied to give longer or shorter intervals of rest to the articles propelled through the machine, and at the same time maintain the speed of the endless conveyer constant.

Although I have herein shown and described my improvements as having the uniformly, continuously movable member in the form of an endless chain, and the propelling arms pivotally mounted on the chain and governed by a stationary cam, yet I am aware that the principle of the invention may be embodied in other constructions without departing from the spirit of the invention, and all changes and modifications are contemplated as come within the scope of the claims appended hereto. It will also be noted that the propelling arms, in traveling from the position shown at B to the position shown at C, will be retarded owing to the rollers 24 traversing the portion of the groove cam between the points g and h. This construction of the groove cam causes the propelling arms to engage the cans at a slower speed than the bodily speed of the endless conveyer, which prevents spilling of the contents of the can or accidental displacement of the can covers, and permits of a very gradual starting of the stationary filled can.

I claim:—

1. A mechanism of the character described comprising, in combination: a frame having an operating station thereon; a uniformly moving member; an element bodily movable with said member and having a portion thereof adapted to propel an article; and means, operative as said member moves and conveys, for varying the speed of movement of said propelling portion of said element in the direction of its path of travel, to thereby change the movement of the article being propelled from uniform to irregular and permit the article to remain stationary for a period relatively to the operating station, substantially as specified.

2. A mechanism of the character described comprising, in combination: a frame having an operating station thereon; a continuously moving member; an element carried by and bodily movable with said member and having a portion thereof adapted to propel an article; and stationary means, operative while said member is conveying the article, for accelerating the speed of travel of said propelling portion of the element at one time and at another time retarding its speed of travel, to thereby cause the movements of the article being propelled to be irregular and permit the article to remain stationary for a period relatively to the operating station, substantially as specified.

3. A mechanism of the character described comprising, in combination: a table; a continuously moving member; an element carried by and bodily movable with said member and adapted to propel an article along said table; and means for changing the speed of travel of the article propelling portion of said element in the direction of its path of movement and during the movement of the article over the table, substantially as specified.

4. A mechanism of the character described comprising, in combination: a table; a continuously moving carrying member adjacent said table; a pivotally mounted propelling arm carried by and bodily movable with said member to move the article along said table; and a cam for moving said arm, as the same is bodily moved with the carrying member, in the direction of its path of travel while moving articles on the table, substantially as specified.

5. A mechanism of the character described comprising, in combination: an operating station; a uniformly movable endless carrying member; an arm carried by said endless member and movable bodily therewith for propelling articles; and stationary means, operative while said arm is conveying an article, for imparting to said arm, movements in the direction of its travel independent of its bodily movement with said carrying member, to thereby permit the article to remain stationary, for a period, relatively to the operating station, substantially as specified.

6. A mechanism of the character described, comprising, in combination: a table over which articles are adapted to be propelled and pass adjacent an operating station; a uniformly movable carrying member having a plurality of independently movably mounted propelling elements carried thereby and bodily movable therewith; and a stationary cam for actuating said elements as the same are moved by said member over the table while approaching and receding from the operating station, said cam having a portion $b$, $c$, for accelerating the propelling portions of said elements, and a portion $c$, $d$ for retarding said portions as the same approach a position adjacent the operating station, substantially as specified.

7. A mechanism of the character described, comprising, in combination: a table over which articles are adapted to be propelled and pass adjacent an operating station; a uniformly movable carrying member having a plurality of independently movably mounted propelling elements carried thereby and bodily movable therewith; and a stationary cam for actuating said elements as the same are moved by said member over the table while approaching and receding from the operating station, said cam having a portion $b$, $c$ for accelerating the propelling portions of said elements, a portion $c$, $d$ for retarding said portions as the same approach a position adjacent the operating station, said cam having also a portion $g$, $h$ for retarding the movement of said propelling portions adjacent the point where said elements first engage the articles, substantially as specified.

8. A mechanism of the character described comprising, in combination: a table; a continuously movable endless chain; a plurality of propelling arms pivotally mounted on and carried by said chain, said arms having a portion of their path of travel above said table and oscillatable in a plane parallel thereto when over it; and a stationary cam adapted to oscillate said arms as the same are bodily moved with the chain, substantially as specified.

9. A feeding mechanism of the character described comprising, in combination: a table provided with a guide-way thereon and having a station at which an operation is adapted to be performed on an article being fed; a uniformly movable member; an arm pivotally mounted on and bodily movable with said member and having a path of travel extending over said table;

and a stationary cam for oscillating said arm in the plane of its path of movement, said cam being so arranged that a part of the arm, at the time it reaches said station, is moved in a backward direction at a speed not less than the speed of the uniformly movable member, whereby an article being fed by said arm is given a period of rest at said station, substantially as specified.

PAUL W. FLEISCHER.

Witnesses:
W. D. FOSTER,
C. W. GRAHAM.